(12) United States Patent
Harel et al.

(10) Patent No.: US 9,298,493 B1
(45) Date of Patent: Mar. 29, 2016

(54) MANAGING SYSTEM I/O LOAD

(75) Inventors: Shay Harel, Marlborough, MA (US); Peter Puhov, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 190 days.

(21) Appl. No.: 13/172,106

(22) Filed: Jun. 29, 2011

(51) Int. Cl.
*G06F 9/46* (2006.01)

(52) U.S. Cl.
CPC ........................................ *G06F 9/46* (2013.01)

(58) Field of Classification Search
CPC ................................ G06F 9/4843; G06F 9/52
USPC .......................................................... 718/102
See application file for complete search history.

(56) References Cited

U.S. PATENT DOCUMENTS

| 7,409,687 | B2 * | 8/2008 | Ofer et al. | 718/102 |
| 8,127,295 | B1 * | 2/2012 | Jones et al. | 718/104 |
| 8,250,257 | B1 * | 8/2012 | Harel et al. | 710/38 |
| 2011/0072434 | A1 * | 3/2011 | Avni et al. | 718/102 |

\* cited by examiner

*Primary Examiner* — Emerson Puente
*Assistant Examiner* — Steven Do
(74) *Attorney, Agent, or Firm* — Krishnendu Gupta; Jason A. Reyes

(57) ABSTRACT

A method is used in managing system I/O load. When a background operation is available to be executed on a processor core, it is determined whether a credit value associated with the processor core satisfies a memory use criterion. The background operation has a memory use requirement and is executed on the processor core when the credit value associated with the processor core satisfies the memory use criterion. The credit value associated with the processor core is modified by an amount corresponding to the memory use requirement.

8 Claims, 5 Drawing Sheets

300

310

| CORE | CREDITS |
|------|---------|
| 0 | 100 |
| 1 | 7 |
| 2 | 85 |
| 3 | 0 |
| n | X |

MANAGING SYSTEM I/O LOAD

BACKGROUND

1. Technical Field

This application relates to managing system I/O load.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, a centralized scheduler may be used to schedule processing of host-generated I/Os and other I/O operations, such as background I/O operations (also referred to simply as background operations) internally generated and initiated by the data storage system. In such embodiments, the centralized scheduler has sufficient knowledge to schedule and coordinate host-generated I/Os and background I/O operations.

SUMMARY OF THE INVENTION

A method is used in managing system I/O load. When a background operation is available to be executed on a processor core, it is determined whether a credit value associated with the processor core satisfies a memory use criterion. The background operation has a memory use requirement and is executed on the processor core when the credit value associated with the processor core satisfies the memory use criterion. The credit value associated with the processor core is modified by an amount corresponding to the memory use requirement.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
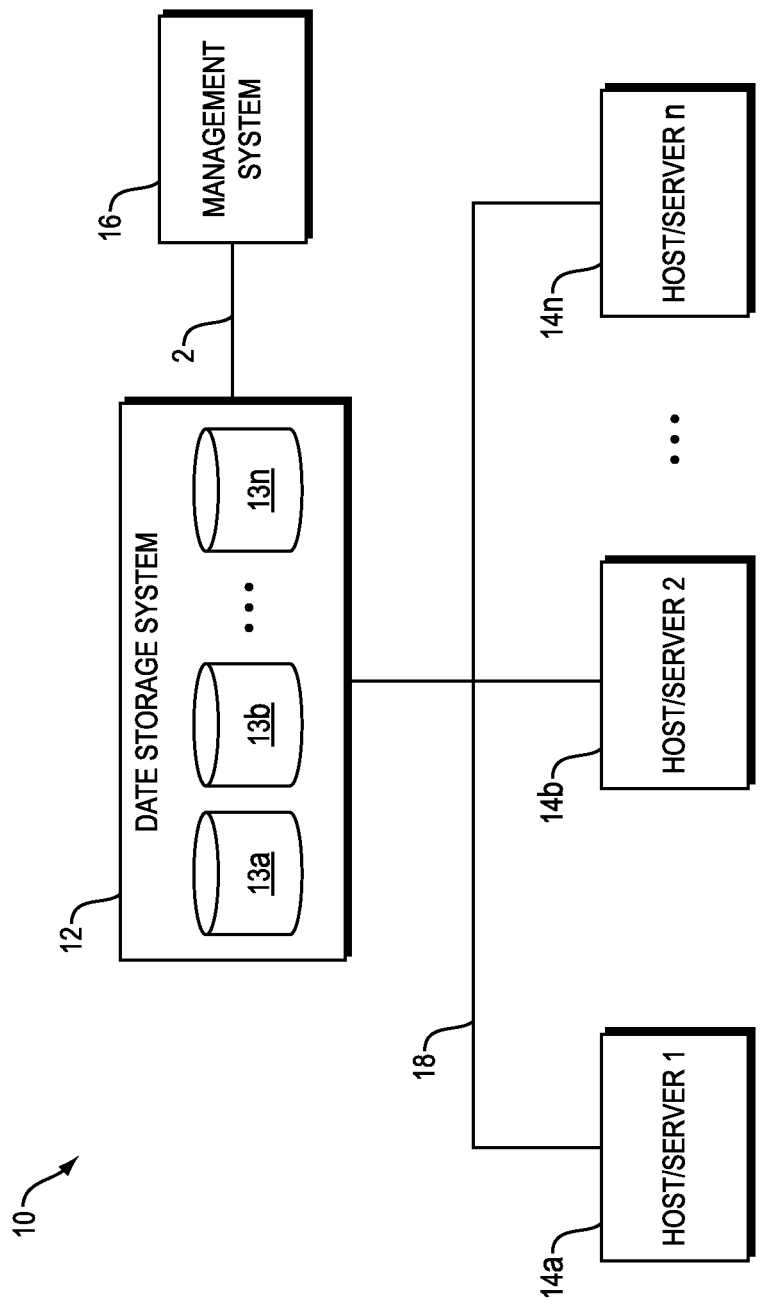
FIGS. 1 and 3 are examples of embodiments of a system that may utilize the techniques described herein.

Described below is a technique for use in managing system I/O load. In at least one implementation, the technique may be used to help provide for self regulating and balancing system load between I/O and background operations using a method of credits which are shared among objects and are consumed based on the operation the objects need to do. For example, in accordance with the technique, in the absence of a central scheduler in a given distributed system, each object in the system is in charge of its own background operations. In such a case, the object checks whether it has enough credits to execute its operation based on the amount of system memory it will use. In the example, an allowance of credits is replenished every second, and the credits are used by all the objects in the system until the credits run out. Once the credits run out in the example, the objects wait for them to be reloaded and in this time period they cannot do any background operations, thereby providing throttling. In at least some cases, such throttling lends itself to being controlled by one or more high level system management entities. In a particular example, an external scheduler can have a system wide view of the overall memory consumption of all modules in the system and divide the system memory between them. This way, a software module generating background operations (e.g., multi core RAID or MCR module) uses the memory it is allotted and does not excessively consume the system memory bandwidth.

A conventional approach uses a centralized scheduler which creates a tightly coupled system in which the central scheduler keeps track of each operation that is done by each of the objects. Conventionally this means every change in the scheduler or the I/O path has to be coordinated and has the potential to affect both. The conventional approach also requires much coordination between the two subsystems which comes at the expense of I/O execution. In the conventional approach there is no consideration given to the system memory bandwidth and there is no use of knowledge about how much memory each operation costs, which means conventionally each background operation is considered to have the same impact on the system, which is not the case in reality.

By contrast, at least one embodiment in accordance with the technique described herein provides a loosely coupled solution in which there is no dependency or knowledge sharing between the I/O path and the background operations, which gives improvements in code size and the time needed to synchronize operations. Such solution takes into consideration the real time bandwidth usage of each background operation and once an operation is done it impacts the memory resources used by the other objects in a way that forces them to yield if they run out of credits, hence leaving more bandwidth to other modules in the system. With respect to such solution, the notion of a central pool of credits helps reduce or eliminate the need for an entity that controls each operation, as all objects "withdraw" on their own from the central pool and after it runs out they all wait for it to be refilled.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more 110 devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
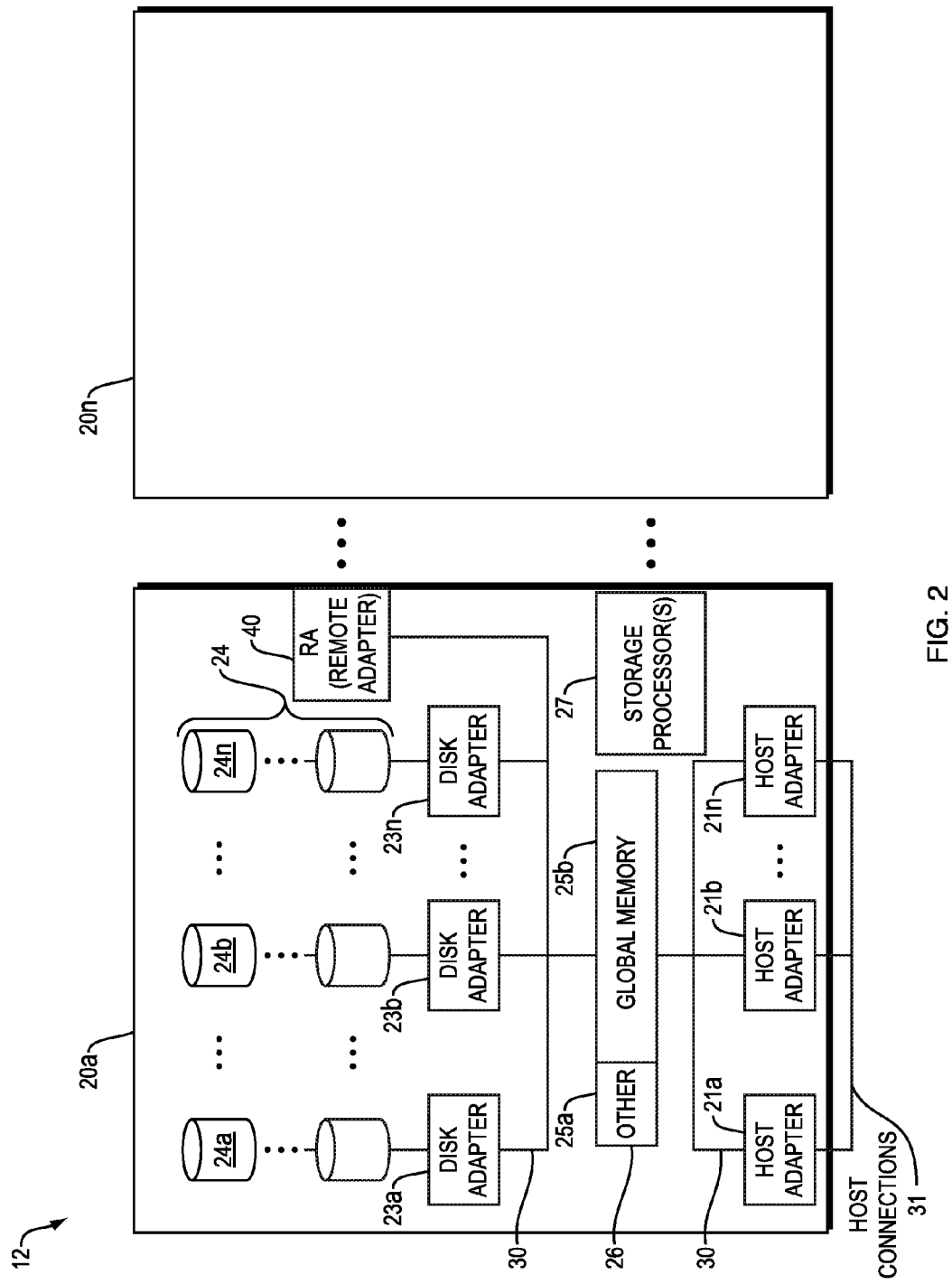
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

I/O operations performed in a data storage system may include I/O operations of a first type which are received by the data storage system from an external client, such as a host. I/O operations performed by the data storage system may also include other I/O operations of a second type which are not initiated by the host or other external client. Rather, these other I/O operations may be initiated from within the data storage system, such as by a backend component of the data storage system. I/O operations of this second type may be referred to as background I/O operations which are not executed in a context of a host I/O, or more generally, in a context of an external client I/O operation. Background I/O operations may include I/O operations performed in connection with, for example, monitoring and maintaining the data storage system such as repairing a RAID drive (e.g., read and/or write operations in connection with correcting corrupted user data and/or RAID parity information), performing an I/O operation to check on the status and proper functioning of a physical drive, initializing a physical drive by writing out a particular initialization value or pattern to physical drive portions, and the like.

Figure 3:
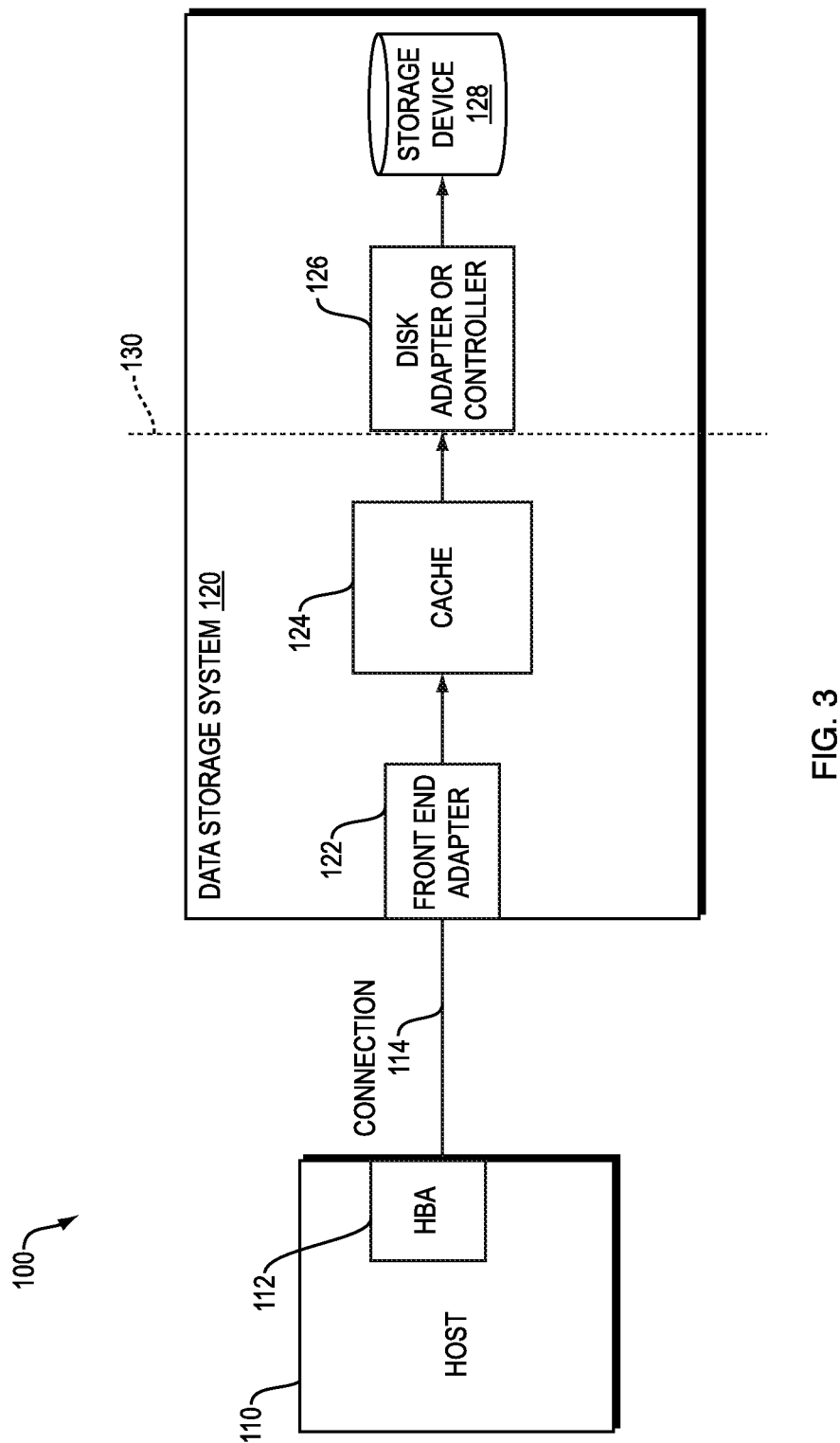

With reference to FIG. 3, shown is an example 100 illustrating components of a system that may be used in performing the different types of I/O operations in an embodiment in accordance with techniques herein. The example 100 includes a simplified view of components of a system as described above. The example 100 includes a host 110 with an HBA 112. The host 110 communicates with data storage system 120 over connection 114. Connection 114 may be, for example, a network connection between the HBA 112 and a front end adapter 122 of the data storage system 120. As described above, a front end adapter 122 may be, for example, an FA. The data storage system 120 also includes a cache 124, a DA or storage controller 126 and one or more physical storage devices 128 (e.g., disks or solid state devices (SSDs) such as a flash drive). The host 110 may issue an I/O operation to the data storage system over connection 114. For example, the host may issue a write operation to write data to a portion of storage device 128. In one embodiment, the data of the write operation may first be stored in cache 124 and then destaged at a later point in time by DA 126 to the physical storage device 128. The foregoing host write operation is an example of an I/O operation of the first type described above. The DA is an example of a backend data storage system component that may also initiate I/O operations. For example, the DA may initiate an I/O operation to periodically test or verify the health and status of the physical device 128. This latter I/O operation as initiated by the DA may be characterized as a background I/O operation described above which is not in the context of an I/O operation from the host or other client external to the data storage system. In such an embodiment, line 130 may represent an imaginary line within the system 120 partitioning the backend from the front end of the data storage system 120. In this embodiment, the background operations may be characterized as data storage system initiated operations and, more particularly, in some embodiments, such background operations may be initiated by a backend component such as a DA.

In a system such as a data storage system described above, there is contention for resources of the data storage system when performing the different types of I/O operations. Described in following paragraphs are techniques that may be used in connection with using credits to control background I/O operations (e.g., the second type described above). The techniques herein utilize a distributed approach where, for example, each object in an object-oriented embodiment performs processing based on credits to assess whether it should perform a background I/O operation.

Figure 4:
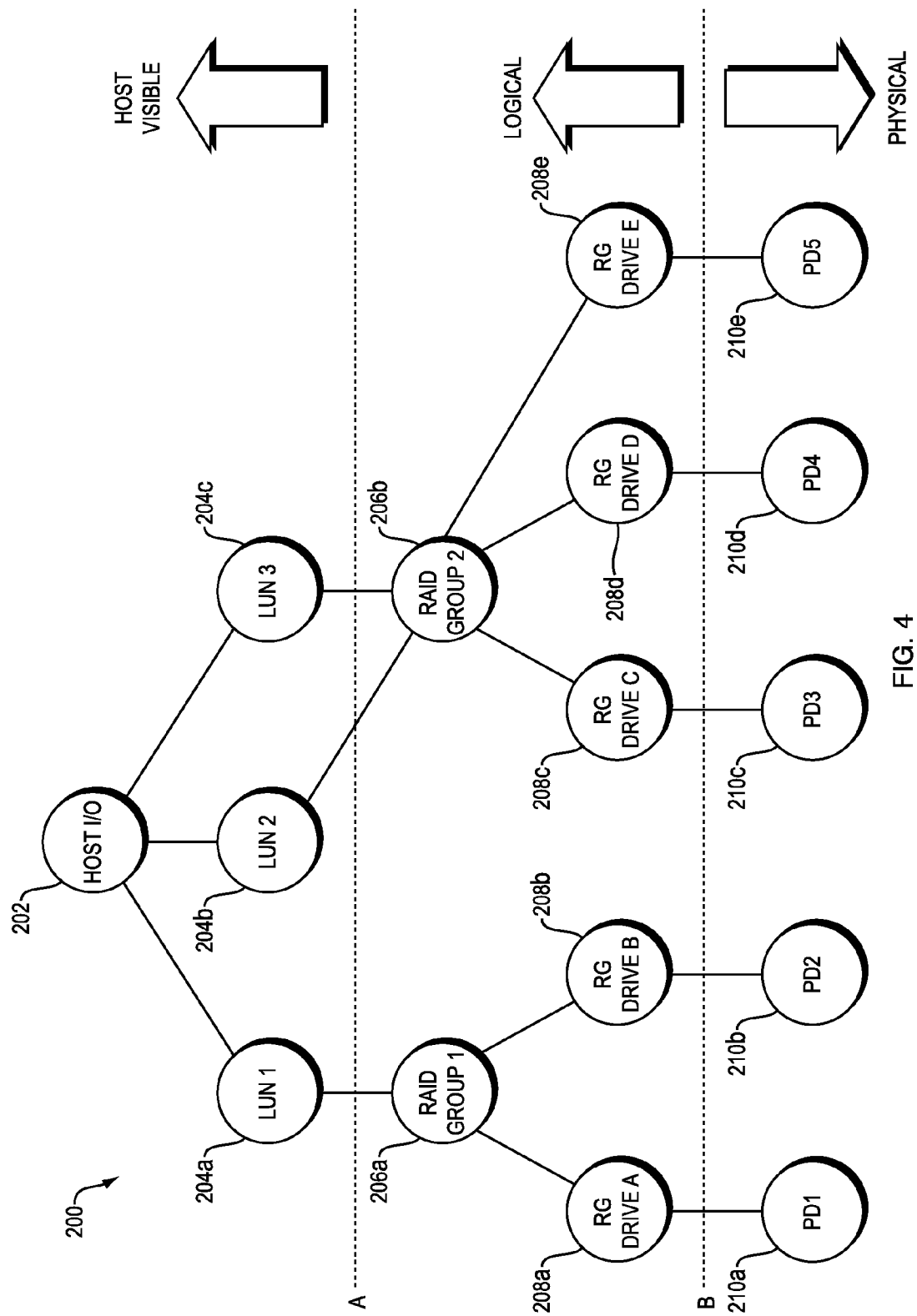
FIG. 4 is an example of graph that may be used in an embodiment in accordance with techniques herein.

Referring to FIG. 4, shown is an example of a graph that may be used in an embodiment in accordance with techniques herein. The example 200 includes a graph with nodes and edges between the nodes. The graph in this example forms a tree having a root node 202 at a first level, nodes 204a-204c at a second level, nodes 206a-206b at a third level, nodes 208a-208e at a fourth level and leaf nodes 210a-210e at a fifth level. The graph may be a representation of logical and/or physical components in the data storage system with the root node 202 corresponding to an aggregator or external interface node for the data storage system, or more specifically, an interface node to the backend of the data storage system. Each node in the graph other than the root node represents an object associated with a corresponding physical or logical entity in the data storage system. The leaf nodes at the fifth level correspond to objects associated with physical storage devices, such as disk drives (e.g., Fibre channel drives, SATA drives) or SSDs. Nodes at levels other than the first level (root node) and bottom most level (level 5 including leaf nodes 210a-210e) may correspond to, for example, RAID groups, drives or members of a RAID group, LUNs, and the like. In this example, nodes 204a-204c correspond, respectively, to objects associated with LUNs 1-3, nodes 206a-206b correspond, respectively, to objects associated with RAID GROUPS 1 and 2, nodes 208a and 208b correspond to objects associated with RAID drives or members of RAID GROUP 1, nodes 208c-208e correspond to objects associated with RAID drives or members of RAID GROUP 2, and nodes 210a-210e correspond to objects associated with physical storage devices as described above.

A path in the graph may correspond to an I/O path over which an I/O operation may be forwarded to a physical device (PD) for processing. For example, a host I/O operation directed to LUN 3 to write data may result in writing user data and/or parity information to a portion of PD 5 forwarded along the path represented by nodes 202, 204c, 206b, 208e, 210e. The foregoing may be a complete path from the root to a leaf node. An I/O operation, such as a background I/O operation, may be forwarded along a path from a first node which is at a level M in the graph, M>1 (e.g., the root node is at level 1), to one of its descendant nodes in the graph, such as one of the leaf nodes or other nodes at a level >M in the graph.

Each object may be, for example, a software driver on the data storage system. Each object has its own monitor thread which periodically performs background I/O operations and possibly other operations to ensure status, health and other aspects of the object. Such processing including background I/O operations initiated by the monitor thread may, for example, determine whether the object is healthy and either currently serving/performing processing for a client, or whether the object is in a state where it is ready and capable of performing processing for a client if requested. The monitor threads of the objects may be scheduled for execution in the data storage system along with other threads and/or processes. The monitor threads may be allocated portions of CPU time for execution also known as time slices during which the foregoing, including background I/O operations, may be initiated and/or performed. If a monitor thread determines that its associated object is not in a healthy or ready state (e.g, ready to service a request), processing may be performed by the monitor thread using its time slice to place the object in such a ready state. For example, as part of rebuilding data for a drive of a RAID GROUP, the monitor thread during its time slice may issue and execute appropriate read and/or write operations executed in the context of the monitor thread as background I/O operations.

It should be noted that the graph of FIG. 4 may include other levels and nodes that may vary with an embodiment. For example, the graph may also include nodes corresponding to objects associated with ports, physical drive enclosures for groups of drives, other logical types of devices, and the like.

Also included in the example 200 are dashed lines denoted as A and B. Portions of the graph above line A may represent those entities of the data storage system which are visible to the host or other external client. For example, the host may send I/O requests directed to one or more LUNs. The host does not have any knowledge regarding underlying RAID groups that may be included in an embodiment. Nodes below line A may correspond to entities known or exposed within the data storage system, but not to the host. Dashed line B represents the partitioning of the graph into nodes corresponding to physical and logical entities. Nodes above line B (other than the root) may correspond to logical entities (e.g., LUNs, RAID groups, RAID drives or members) of the data storage system. Nodes below line B may correspond to physical entities, such as physical storage devices, of the data storage system.

Figure 5:
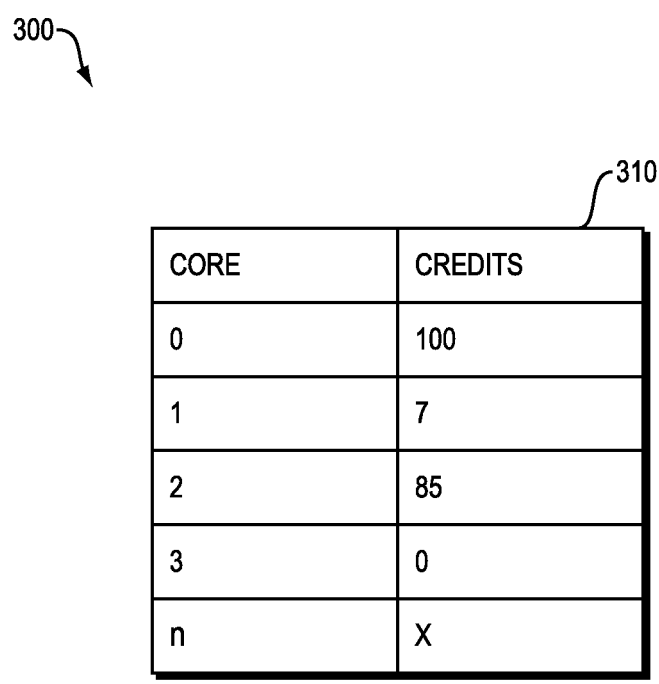
FIG. 5 is an example illustrating a table of credits per core.

Referring to FIG. 5, shown is an example of a table that may be used in connection with I/O operation priorities in an embodiment in accordance with techniques herein. The example 300 includes a table 310 of credits per processor core wherein the credits are used as described below.

It is desirable that background operations do not consume excessive memory and processor bandwidth, and therefore that background operations are regulated. Thus, whenever an object needs to execute a background operation, the object checks whether there are sufficient credits to execute the background operation, which relies on a self balancing system that does not require a main central entity to determine whether the background operation can be executed.

In at least some implementations, each type of background operation is a known operation in that the system has information about how much memory the background operation is expected to consume when the background operation is executed. Thus, for example, a "zeroing drive" operation that writes a 1 GB I/O to a drive may be known to require 1 GB of memory during execution, and an object may check table 310 for whether sufficient credits remain available for core 0 to use 1 GB, and if so, credits for core 0 are reduced accordingly and the operation proceeds to execution, and if not, the operation does not proceed to execution and at a later point the object checks table 310 again. Depending on the implementation, credits may be replenished in whole or in part in accordance with a particular scheme, e.g., on a regular schedule (e.g., every second) or per a particular policy or in response to a trigger or request.

Thus, execution of background operations is regulated by regulating how much memory is consumed by background operations, e.g., every second.

In at least some implementations, if the object fails after a number of attempts (e.g., two attempts) to find sufficient credits for the background operation, the object has the operation proceed to execution anyway, to avoid excessively delaying such execution. In general, a goal of the technique and use of the credits is to throttle, slow down, and/or space out execution of background operations, not to starve the system.

In at least some implementations, replenishment of credits can be controlled, e.g., by a system scheduler or other logic or entity, to control the presetting of how many credits are loaded for each core. For example, a system scheduler may have information indicating that a top layer of software currently requires a lot of memory, and therefore temporarily reduces a level of replenishment of credits for one or more cores, e.g., to 70% of normal, to allow more memory bandwidth for the top layer of software. In another example, a service person may raise a level of replenishment, e.g., to 150% of normal, or to devote all memory to background operations, e.g., by using a command line interface command, so that background operations related to service work can be completed more rapidly.

In general, in accordance with the technique described herein, control of memory use is used as a way to control or throttle background operations, and in this way memory serves as a proxy for consumption of processor resources (which can be more difficult to control directly), since in at least some systems memory use grows linearly with use of processor resources. In at least some systems, memory use itself is a primary bottleneck.

For example, if a new drive is inserted as a member of an existing RAID group and its data needs to be built or rebuilt from the other members of the RAID group, background operations including XOR and DMA operations may be used to accomplish such building or building and may require 50-100 megabytes of memory depending on the platform and how many drives are involved.

In at least some implementations, replenishment is performed solely on a schedule, so that, for example, credits are not returned based on completion of a background operation, and replenishment is performed without reference to whether a background operation that previously proceeded to execution has completed before scheduled replenishment. Thus, for example, if a background operation needed 3 megabytes of memory, corresponding credits do not need to be "given back" if such background operation has not completed before scheduled replenishment, or when such background operation does complete. Thus, in such implementations, the credits are used to help add some control over memory and processor resources consumption.

In at least some systems, many, most, or all background operations are short enough that they reliably complete before scheduled replenishment.

At least some implementations may rely on a policy, e.g., enforced by a policy engine, to control one or more characteristics of credit replenishment. For example, a policy may describe a time of day schedule so that use of memory by background operations can be increased outside of regular business hours, e.g., can "ramp up" at night.

In a system in which only one processor core is available or it is not important to control memory use per processor core, one global batch of credits may be used for all background operations.

In many cases, it is in fact helpful to control memory use per processor core, at least in an architecture that assigns memory per core and makes other memory available on slower access via a bus, which is less efficient. In such an architecture, each core may be assigned a different amount of memory, and each core may have different levels of processing utilization, which amount and levels may be taken into account in determining how many credits to supply in replenishment per core. For example, if an important user application is running on core 2, a system scheduler or other entity can use a small number of credits for replenishment for core 2, to help avoid slowing down the user application.

Thus, determination of whether to allow a background operation to proceed to execution is decentralized. In accordance with techniques herein, each object in the system controls whether to forward and perform its own background operations.

Credits may be used in any of different representative ways. FIG. 5 illustrates 100, 7, 85, 0 credits available for cores 0,1,2,3 respectively. 100 credits may represent 100 megabytes or 100 gigabytes or some other amount, or may represent 100% of total memory or available memory.

In a particular embodiment, memory use control may be accomplished by using credit replenishment scheduling to control the memory available for performing a background operation. The scheduling uses credits to represent the amount of memory available to an object for performing a background operation and only permits a background operation to proceed to execution if the core has sufficient credits available. A memory use control procedure begins when an object needs to perform a background operation, at which point the object checks whether the core has sufficient credits available to allow performance of the background operation, and if not, the object waits and checks again later. If the core does have sufficient credits, the object starts execution of the background operation, and reduces the credits of the core by an appropriate amount In the table of FIG. 5, a credit counter reflects the available credits of a core. Each core is given an initial amount of credits, which may be different for each core. A credit counter for each core is decremented according to the memory use of a background operation whenever a core starts executing the background operation. A credit counter for any core may range from zero to the initial value of credits provided to the core.

The credit counters for each core linked to a scheduler are given additional credit whenever the scheduler is driven to replenish, at which point the credit counter for the core is set equal to the initial amount of credits provided to the core. This ensures that a core does not accumulate credits during one or more periods in which the core does not have background operations to execute.

By setting the initial value of the credit counter, the amount of memory available to each core for background operations may be controlled without exceeding a guaranteed memory use for a core.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing system I/O load, the method comprising:
   when a background operation is available to be executed on a processor core, determining whether a credit value associated with the processor core satisfies a memory use criterion;
   executing the background operation on the processor core when the credit value associated with the processor core satisfies the memory use criterion, the background operation having a memory use requirement;
   modifying the credit value associated with the processor core by an amount corresponding to the memory use requirement;
   detecting that memory is required for operations other than background operations; and
   in response to said detection, reducing a level of replenishments of credits for the processor core in order to allow more memory for the operations other than the background operations, wherein before the reduction the level of replenishment was set to replenish the credits to the credit value.

2. The method as claimed in claim 1, wherein executing the background operation on the processor core is dependent on sufficient credit value being associated with the processor core.

3. The method as claimed in claim 1, wherein the credit value associated with the processor core controls the memory available for facilitating executing the background operation on the processor core.

4. The method as claimed in claim 1, wherein the credit value associated with the processor core can represent a memory value of between zero and one hundred percent of total memory.

5. A system for use in managing system I/O load, the system comprising:
   when a background operation is available to be executed on a processor core, first logic determining whether a credit value associated with the processor core satisfies a memory use criterion;
   second logic executing the background operation on the processor core when the credit value associated with the processor core satisfies the memory use criterion, the background operation having a memory use requirement;
   third logic modifying the credit value associated with the processor core by an amount corresponding to the memory use requirement;
   fourth logic detecting that memory is required for operations other than background operations; and
   in response to said detection, fifth logic reducing a level of replenishments of credits for the processor core in order to allow more memory for the operations other than the background operations, wherein before the reduction the level of replenishment was set to replenish the credits to the credit value.

6. The system as claimed in claim 5, wherein executing the background operation on the processor core is dependent on sufficient credit value being associated with the processor core.

7. The system as claimed in claim 5, wherein the credit value associated with the processor core controls the memory available for facilitating executing the background operation on the processor core.

8. The system as claimed in claim 5, wherein the credit value associated with the processor core can represent a memory value of between zero and one hundred percent of total memory.

* * * * *